(12) United States Patent
Liou et al.

(10) Patent No.: US 10,007,111 B2
(45) Date of Patent: Jun. 26, 2018

(54) MIRROR DISPLAY DEVICE WITH POLARIZATION CONVERSION LAYER

(71) Applicant: InnoLux Corporation, Miao-Li County (TW)

(72) Inventors: Hao-Yu Liou, Miao-Li County (TW); Hong-Sheng Hsieh, Miao-Li County (TW); Wen-Kuen Chen, Miao-Li County (TW); Yu-Sheng Chen, Miao-Li County (TW); Jian-Cheng Chen, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 14 days.

(21) Appl. No.: 15/088,194

(22) Filed: Apr. 1, 2016

(65) Prior Publication Data
US 2016/0313555 A1 Oct. 27, 2016

(30) Foreign Application Priority Data
Apr. 22, 2015 (CN) .......................... 2015 1 0191995

(51) Int. Cl.
*G02B 5/30* (2006.01)
*G02B 27/01* (2006.01)
*G02B 27/28* (2006.01)
*G02F 1/1335* (2006.01)
*G02F 1/13363* (2006.01)

(52) U.S. Cl.
CPC ....... *G02B 27/0101* (2013.01); *G02B 27/283* (2013.01); *G02F 1/13363* (2013.01); *G02F 1/133528* (2013.01); *G02F 1/133536* (2013.01); *G02F 1/133555* (2013.01); *G02B 5/3041* (2013.01); *G02F 2001/133557* (2013.01); *G02F 2001/133562* (2013.01)

(58) Field of Classification Search
CPC .......... G02B 1/08; G02B 5/30; G02B 5/3025; G02B 5/3033; G02B 5/3041; G02B 5/305; G02B 5/3058; G02B 5/3066; F21V 9/14; H04N 9/3167
USPC ............ 359/483.01, 485.01, 485.02, 485.03, 359/485.04, 485.05, 487.01, 487.03, 359/489.01, 489.06, 489.08, 489.11, 359/489.12, 489.13, 489.15; 362/19; 353/20
See application file for complete search history.

(56) References Cited

U.S. PATENT DOCUMENTS

2016/0178964 A1* 6/2016 Sakai ................ G02F 1/133536
345/592

* cited by examiner

*Primary Examiner* — Arnel C Lavarias
(74) *Attorney, Agent, or Firm* — Bacon & Thomas, PLLC (57) ABSTRACT

A mirror display device, which includes: a display panel; a first polarizer disposed on the display panel; and an optical structure disposed on the first polarizer. The optical structure includes: a first polarization conversion layer; and a second polarization conversion layer or a reflection layer, wherein the first polarization conversion layer is disposed between the first polarizer and the second polarization conversion layer or the reflection layer; wherein a sum of a first reflectance and a first transmittance of the optical structure is greater than 100% and less than 150%, in which the first reflectance is referred to a percentage of external light irradiating into the mirror display device and reflected by the optical structure, and the first transmittance is referred to a percentage of light passing through a first polarizer and then irradiating into and passing through the optical structure.

9 Claims, 10 Drawing Sheets

MIRROR DISPLAY DEVICE WITH POLARIZATION CONVERSION LAYER

CROSS REFERENCE TO RELATED APPLICATION

This application claims the benefits of the Chinese Patent Application Serial Number 201510191995.9, filed on Apr. 22, 2015, the subject matter of which is incorporated herein by reference.

BACKGROUND

1. Field of the Invention

The present disclosure relates to a mirror display device and, more particularly to a mirror display device with an optical structure having high transmittance and reflectance.

2. Description of Related Art

In recent years, all the display devices are developed toward having small volume, thin thickness and light weight as the display techniques progresses; and the mainstream display devices are liquid crystal display (LCD) devices, organic light emitting diode (OLED) display devices or the like. Herein, the daily used devices such as cell phones, notebooks, video cameras, cameras, music players, navigation devices and televisions are one developed product of every manufacturer.

However, except for the display device only for displaying images, display devices with multi-functions, for example touch display devices and mirror display devices are developed to meet the customer's variable requirements.

With regard to the mirror display devices, to achieve the purpose of reflecting images as the mirror and displaying images, a reflection layer is generally equipped on the display panel to reflect the external light. Although the reflection layer can provide the function of reflecting the external light, the light from the display panel may also be reflected by the reflection layer and the transmittance of the light from the display panel is reduced. In this case, the light transmittance of the display panel and the reflectance of external light reflectance are not ideal at the same time.

Therefore, it is desirable to provide a mirror display device with high transmittance and high reflectance to meet the customer's requirements.

SUMMARY

According to some embodiments, an object of the present disclosure is to provide a mirror display device comprising an optical structure, in which a sum of a first reflectance and a first transmittance of the optical structure is greater than 100% and less than 150%. Thus, the conventional mirror display device having insufficient first transmittance and/or first reflectance can be improved.

The mirror display device of the present disclosure comprises: a display panel; a first polarizer disposed on the display panel; and an optical structure disposed on the first polarizer. The optical structure comprises: a first polarization conversion layer; and a second polarization conversion layer or a reflection layer, wherein the first polarization conversion layer is disposed between the first polarizer and the second polarization conversion layer or between the first polarizer and the reflection layer, wherein a sum of a first reflectance and a first transmittance of the optical structure is greater than 100% and less than 150%. The first reflectance is referred to a percentage of an amount of external light irradiating into the mirror display device and reflected by the optical structure, and the first transmittance is referred to a percentage of an amount of light passing through the first polarizer and then irradiating into and passing through the optical structure.

In the mirror display device of the present disclosure, the first transmittance (T %) of the optical structure may be less than 94%; for example is 30%<T %<94%; and is 30%<T %<80%. In addition, the first reflectance (R %) may be larger than 50%; for example is 50%<R %<90%; and is 50%<R %<75%.

In the mirror display device of the present disclosure, the first polarizer has a first transmission axis, the first polarization conversion layer has a second transmission axis, and an included angle between the first transmission axis and the second transmission axis can be in a range from 0 degree to 5 degree; and for example the aforementioned included angle is 0 degree.

In the mirror display device of the present disclosure, when the optical structure comprises the first polarization conversion layer and the second polarization conversion layer, the second polarization conversion layer further has a third transmission axis; wherein an included angle between the second transmission axis and the third transmission axis may be in a range from 5 degree to 90 degree, for example is in a range from 10 degree to 80 degree, and in a range from 25 degree to 75 degree.

In the mirror display device of the present disclosure, when the optical structure comprises the first polarization conversion layer and the reflection layer, the reflection layer may selectively has polarization selectivity greater than 0% and less than 10%. Herein, the term "polarization selectivity" refers to a function of the layer (i.e. the reflection layer), wherein the layer has different transmittance or reflectance when the light, which can be divided into two different linear polarized lights respectively polarized vertical and parallel to the optical axis of the layer, passes through or is reflected by the layer. In the present disclosure, the polarization selectivity less than 10% refers to (TM−TE)/TE<10%, in which TM is the amount of the light, which is polarized vertical to the optical axis of the reflection layer, reflected by or passing through the reflection layer; and TE is the amount of the light, which is polarized parallel to the optical axis of the reflection layer, reflected by or passing through the reflection layer. Meanwhile, when the reflection layer has polarization selectively and further has a fourth transmission axis, the included angle between the second transmission axis and the fourth transmission axis can be in a range from 0 degree to 5 degree; and for example is 0 degree.

In the mirror display device of the present disclosure, the term "polarization conversion layer" refers to a layer, in which light with a polarization direction identical to the transmission axis thereof can pass through the layer, and the light with a polarization direction different from the transmission thereof can be reflected by the layer. More specifically, when light without polarization direction irradiates into the polarization conversion layer, 40-50% amount of the light can pass through the polarization conversion layer, and 40-50% amount of the light is reflected by the polarization conversion layer.

In addition, in the mirror display device of the present disclosure, the term "reflection layer" refers to a layer having a first reflectance ranging from 40% to 75%. More specifically, in consideration of the film absorption effect, 15-60% amount of the light passes through the reflection layer, 40-75% amount of the light is reflected by the reflection layer, when the light with or without polarization direction irradiates into the reflection layer.

The display panel used in the mirror display device of the present disclosure is not particularly limited, as long as it can be co-used with the polarizer. For example, the display panel can be a LCD panel; in this case, the mirror display device may further comprise a backlight module and a second polarizer, wherein the second polarizer is disposed between the backlight module and the display panel, and the display panel is disposed between the first polarizer and the second polarizer. Alternatively, the display panel may be an OLED display panel.

The mirror display device of the present disclosure comprises an optical structure, in which a sum of a first reflectance and a first transmittance of the optical structure is greater than 100% and less than 150%. Thus, the conventional mirror display device having insufficient first transmittance and/or first reflectance can be improved. Especially, the mirror display device of the present disclosure is equipped with the first polarization conversion layer and the second polarization conversion layer/the reflection layer; by adjusting the included angle between the transmission axes of the first polarization conversion layer and the second polarization conversion layer/the reflection layer, not only the sum of the first reflectance and the first transmittance of the optical structure can be arranged to be greater than 100%, but also the first reflectance and the first transmittance thereof can be adjusted according to requirements. Compared to the conversional mirror display device that the first reflectance thereof cannot be adjusted, the present disclosure provides a mirror display device which can further meet the customers' requirements.

Other objects, advantages, and novel features of the disclosure will become more apparent from the following detailed description when taken in conjunction with the accompanying drawings.

DETAILED DESCRIPTION OF THE PREFERRED EMBODIMENT

The present disclosure has been described in an illustrative manner, and it is to be understood that the terminology used is intended to be in the nature of description rather than of limitation. Many modifications and variations of the present disclosure are possible in light of the above teachings. Therefore, it is to be understood that within the scope of the appended claims, the disclosure may be practiced otherwise than as specifically described.

In the following comparative embodiments and embodiments of the present disclosure, the term "first reflectance (R %)" is referred to a percentage of an amount of external light irradiating into the mirror display device and reflected by the reflection structure (including: a reflection layer, a polarization conversion layer, and an optical structure of the present disclosure); and the first reflectance is calculated on the basis of the amount of the light irradiating into the reflection structure which is set to be 100%. In addition, the term "first transmittance (T %)" is referred to a percentage of an amount of light from a backlight module passing through the polarizer and the display panel and then irradiating into and passing through the reflection structure (including: a reflection layer, a polarization conversion layer, and an optical structure of the present disclosure); and the first transmittance is calculated on the basis of the amount of the light irradiating into the reflection structure which is set to be 100%.

Comparative Embodiment 1

Figure 1:
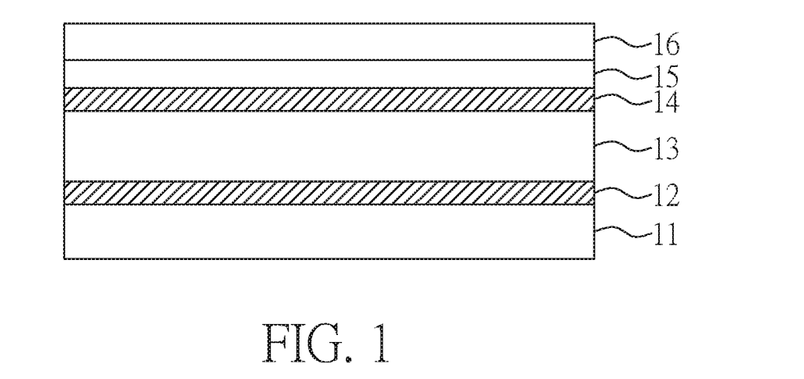
FIG. 1 is a cross-sectional view of a mirror LCD device according to Comparative embodiment 1 of the present disclosure.

FIG. 1 is a cross-sectional view of a mirror LCD device of the present comparative embodiment. The mirror LCD device of the present comparative embodiment comprises: a display panel 13; a first polarizer 14 disposed on the display panel 13; and a reflection layer 15 disposed on the first polarizer 14. In addition, the mirror LCD device of the present comparative embodiment further comprises: a backlight module 11 and a second polarizer 12, wherein the second polarizer 12 is disposed between the backlight module 11 and the display panel 13, and the display panel 13 is disposed between the first polarizer 14 and the second polarizer 12. Furthermore, the mirror LCD device of the present comparative embodiment further comprises: a protection substrate 16, disposed on the outmost side of the mirror LCD device.

In the present comparative embodiment and the following embodiments and comparative embodiments of the present disclosures, the display panel 13 can be a LCD panel known in the art, and the structure thereof is the same as that of the known LCD panel; therefore, the description thereof are not illustrated herein. In addition, the first polarizer 14 and the second polarizer 12 can be the polarizers known in the art, such as linear polarizer; and the protection substrate 16 can be a cover substrate known in the art, such as a cover glass.

Figure 2:
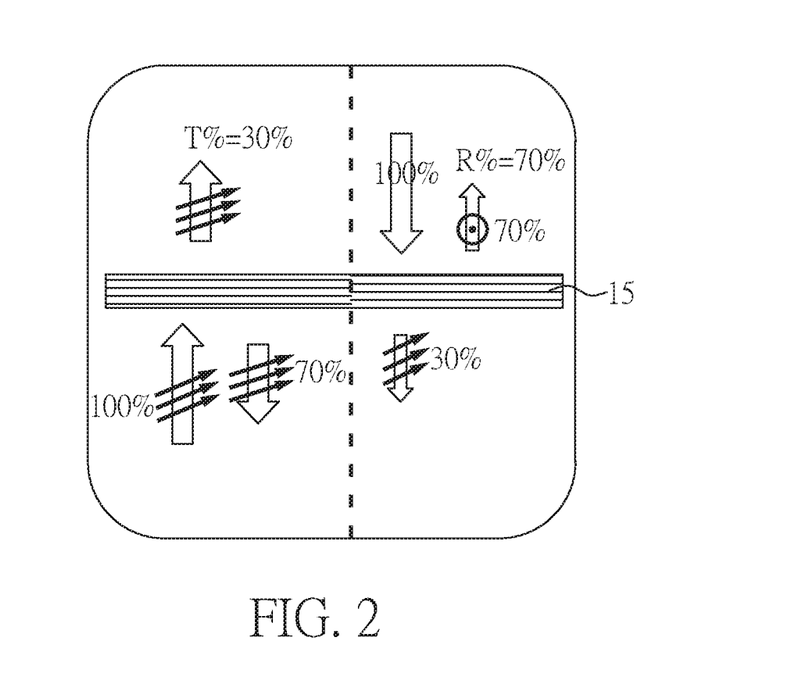
FIG. 2 is a schematic view showing a transmission state and a reflective state of a reflection layer used in Comparative embodiment 1 of the present disclosure.

FIG. 2 is a schematic view showing a transmission state and a reflective state of a reflection layer used in the present comparative embodiment, wherein the left side from the dot line shows the transmission state, and the right side shows the reflective state. Herein, the used reflection layer 15 is a layer having a first reflectance being 70%. As shown in FIGS. 1 and 2, light emitting from the backlight module 11 sequentially passes through the second polarizer 12, the display panel 13 and the first polarizer 14, polarized light can be obtained, and the amount of the polarized light is set to be 100%. For the transmission state, in an ideal situation, about 30% amount of the polarized light may pass through the reflection layer 15, and about 70% amount of the polarized light may be reflected by the reflection layer 15; thus, the first transmittance of the reflection layer 15 is 30%. On the other hand, after external light irradiates into the display device and passes through the protection substrate 16, non-polarized can be obtained, and the amount of the obtained non-polarized light is set to be 100%. For the reflective state, in an ideal situation, about 30% amount of the non-polarized light may pass through the reflection layer 15, and about 70% amount of the non-polarized light may be reflected by the reflection layer 15; thus, the first reflectance of the reflection layer 15 is 70%. Hence, in an ideal situation, the first transmittance of the light passing through the reflection layer 15 plus the first reflectance of the external light reflected by the reflection layer 15 equals to 100% in maximum. Herein, only the reflection layer 15 having the first reflectance being 70% is exemplified, the reflection layer used in all the comparative embodiments and the embodiments of the present disclosure can be a layer having a first reflectance ranging from 40% to 75%.

Figure 3:
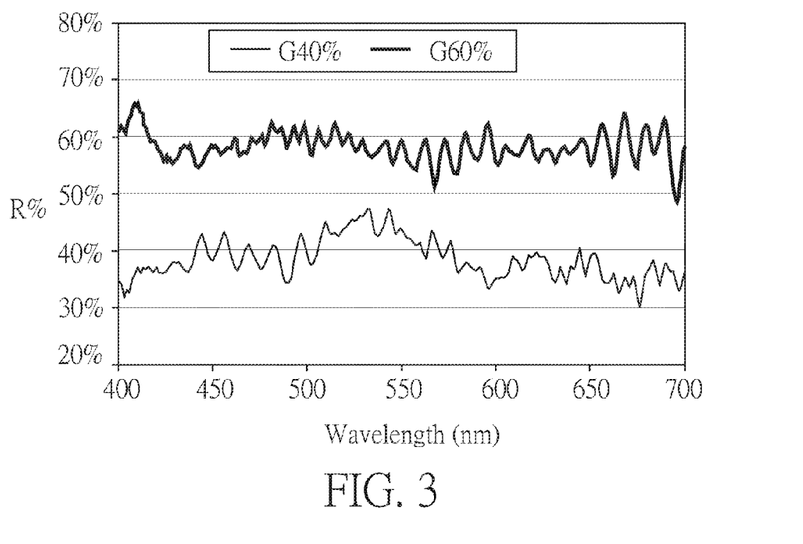
FIG. 3 is a diagram showing detection results of the first reflectance of reflection layers with 40% and 60% reflectance.

The reflection layer having 40%-75% reflectance suitable for the comparative embodiments and embodiments of the present disclosure can satisfy the following conditions. In consideration of the film absorption, when polarized or non-polarized light irradiates into the reflection layer, about 15-60% amount of the light passes through the reflection layer, and about 40-75% amount of the light is reflected by the reflection layer. FIG. 3 is a diagram showing detection results of the first reflectance of reflection layers with 40% and 60% reflectance, in which the reflectance of the reflection layer with 40% reflectance may be less than 40% and that of the reflection layer with 60% reflectance may also be less than 60% due to the film absorption effect. In addition, in all the comparative embodiments and embodiments of the present disclosure, the "first reflectance" of the used reflection layer refers to an average reflectance detected under full wavelength (i.e. 400 nm to 700 nm) condition.

As shown in FIG. 2, in the present comparative embodiment, when the reflection layer 15 is used for the mirror display device, the percentage of the improved first reflectance approximately equals to the percentage of the lost first transmittance. For example, when the first reflectance being 60% is desired, the first transmittance is reduced by about 60% and to about 40%; thus, the transmittance of the mirror display device of the present comparative embodiment is not as high as expected.

Comparative Embodiment 2

Figure 4:
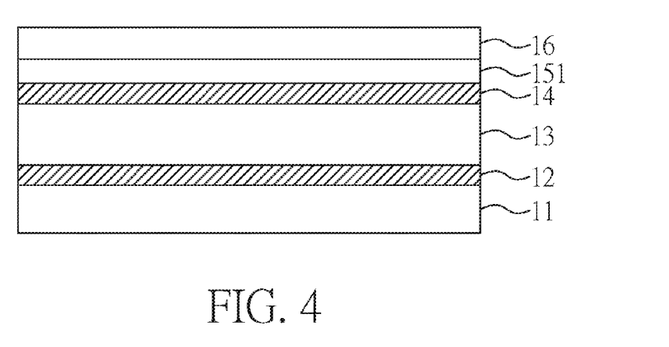
FIG. 4 is a cross-sectional view of a mirror LCD device according to Comparative embodiment 2 of the present disclosure.

The structure of the mirror LCD device of the present comparative embodiment is similar to that of Comparative embodiment 1, except that the reflection layer used in Comparative embodiment 1 is replaced by a first polarization conversion layer 151, as shown in FIG. 4. Herein, the used first polarization conversion layer 151 is a multilayer polymer film having polarization selectivity, wherein the light having identical polarization direction to the transmission axis of the first polarization conversion layer 151 can pass through and the light having different polarization direction to the transmission axis thereof can be reflected by the first polarization conversion layer 151. When light without polarization direction irradiates into the first polarization conversion layer 151, 40-50% amount of the light can pass through and 40-50% amount of the light is reflected by the first polarization conversion layer 151. The specific examples of the first polarization conversion layer 151 may be an advanced polarizer controlled film (APCF) or a dual brightness enhancement film (DBEF).

Figure 5:
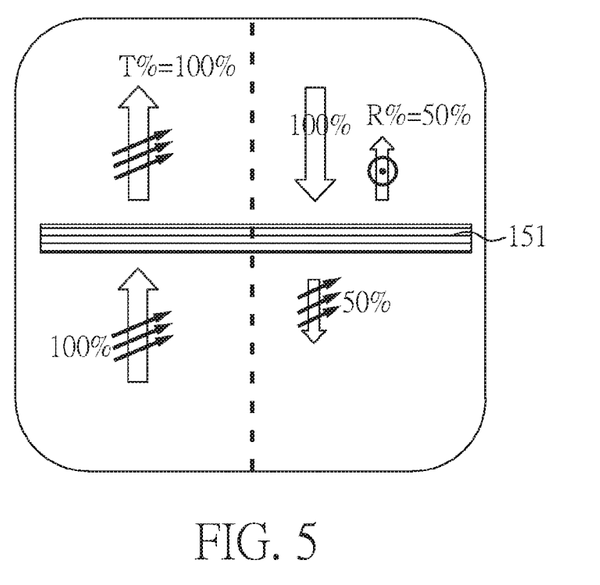
FIG. 5 is a schematic view showing a transmission state and a reflective state of a polarization conversion layer used in Comparative embodiment 2 of the present disclosure.

FIG. 5 is a schematic view showing a transmission state and a reflective state of the polarization conversion layer used in the present comparative embodiment, wherein the left side from the dot line shows the transmission state, and the right side shows the reflective state. As shown in FIGS. 4 and 5, in the present comparative embodiment, the first polarizer 14 has a first transmission axis, the first polarization conversion layer 151 has a second transmission axis, and an included angle between the first transmission axis and the second transmission axis can be in a range from 0 degree to 5 degree, and for example is 0 degree. In the mirror LCD device of the present comparative embodiment, the light emitting from the backlight module 11 sequentially passes through the second polarizer 12, the display panel 13 and the first polarizer 14, then polarized light can be obtained, and the amount of the polarized light is set to be 100%. When the included angle between the first transmission axis and the second transmission axis is in a condition of 0 degree, for the transmission state, since the light irradiate into the first polarization conversion layer 151 is polarized light, all the light (i.e. 100% amount of the light) ideally can pass through the first polarization conversion layer 151; thus, the first transmittance of the first polarization conversion layer 151 is 100%. On the other hand, after external light irradiates into the display device and passes through the protection substrate 16, non-polarized can be obtained, and the amount of the non-polarized light is set to be 100%. Since the first polarization conversion layer 151 has polarization selectivity, in an ideal situation, about 50% amount of the non-polarized light may pass through the first polarization conversion layer 151 and about 50% amount thereof may be reflected by the first polarization conversion layer 151; thus the first reflectance of the first polarization conversion layer 151 is 50%. Hence, in an ideal situation, the first transmittance of the light passing through the first polarization conversion layer 151 plus the first reflectance of the external light reflected by the first polarization conversion layer 151 equals to 150% in maximum.

Figure 6:
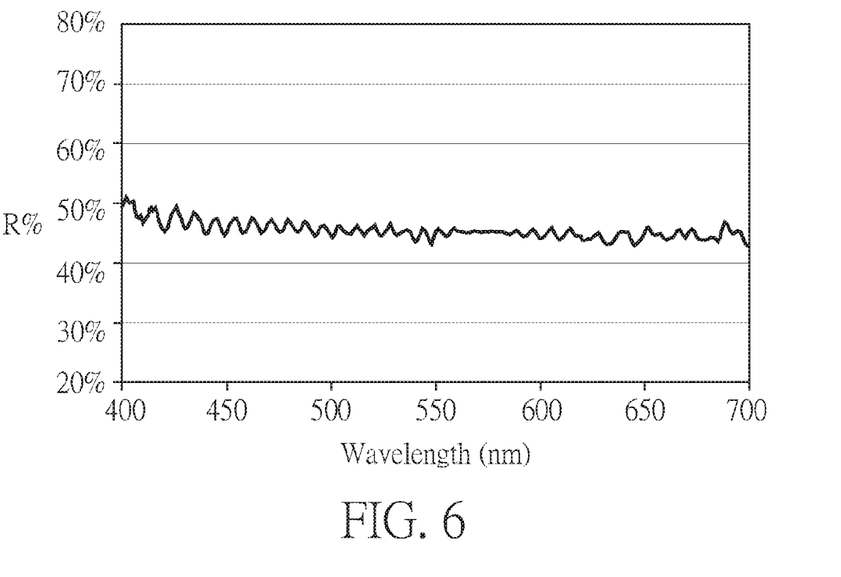
FIG. 6 is a diagram showing a detection result of the first reflectance of a polarization conversion layer used in the present disclosure.
Figure 7:
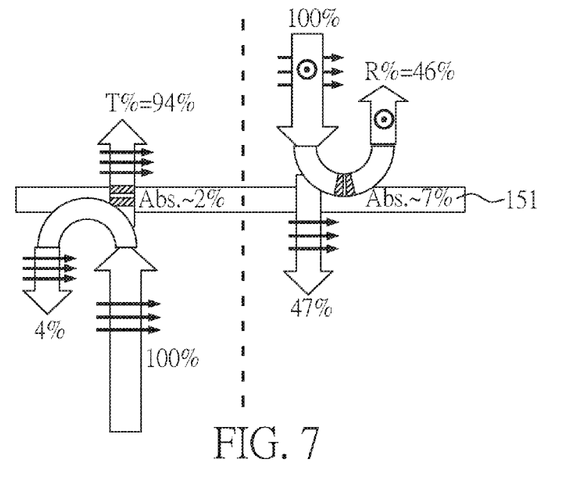
FIG. 7 is a schematic view showing a transmission state and a reflective state of another polarization conversion layer used in the present disclosure.

However, in some situations, the first polarization conversion layer 151 may absorb a part of the light. FIG. 6 is a diagram showing a detection result of the first reflectance of a polarization conversion layer. As shown in FIG. 6, a part of the light with full wavelength irradiating into the polarization conversion layer may be absorbed by the polarization conversion layer; thus, the first reflectance of the polarization conversion layer may be less than 50%. When the mirror LCD display device is used in the detection, the measured first transmittance of the first polarization conversion layer 151 is 94%, the measured first reflectance thereof is 46%, and the sum of the measured first transmittance and the measure first reflectance is 140%. More specifically, as shown in FIGS. 4 and 7 (in FIG. 7, the left side from the dot line shows the transmission state, and the right side shows the reflection state), for the transmission state, when light emitting from the backlight module 11 sequentially passes through the second polarizer 12, the display panel 13 and the first polarizer 14, the amount of the obtained polarized light is set to be 100%, about 2% amount of the polarized light is absorbed by the first polarization conversion layer 151, about 4% amount is reflected by the first polarization conversion layer 151, and about 94% amount can pass through the first polarization conversion layer 151; thus, the first transmittance thereof is 94%. For the reflectance state, the external light irradiates into the display device and passes through the protection substrate 16, the amount of the obtained non-polarized light is set to be 100%, about 7% amount of the non-polarized light is absorbed by the first polarization conversion layer 151, about 47% amount can pass through the first polarization conversion layer 151, and about 46% amount is reflected by the first polarization conversion layer 151; thus the first reflectance thereof is 46%.

Figure 8:
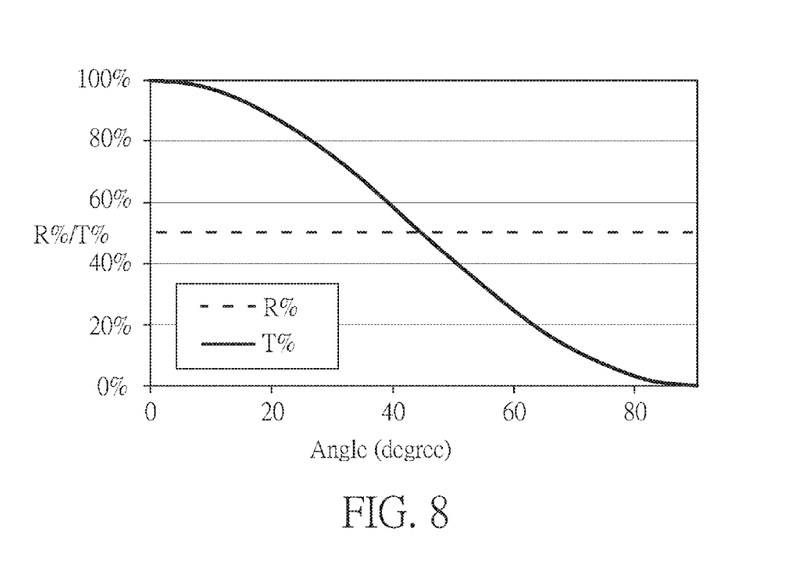
FIG. 8 is a diagram of the first reflectance/the first transmittance of an optical structure vs. the included angle between transmittance axes of the polarization conversion layer and the polarizer in a mirror LCD device according to Comparative embodiment 2 of the present disclosure.

Although the present comparative embodiment provides a high efficient mirror display device having a first transmittance of 94% and a first reflectance of 46%, the first reflectance of the mirror display device still cannot be adjusted. Thus, it is not possible to achieve mirror display devices when different reflectance is required. More specifically, as shown in FIG. 8, which is a diagram of the first reflectance/the first transmittance of an optical structure (i.e. the first polarization conversion layer) vs. the included angle between transmittance axes of the polarization conversion layer and the polarizer in a mirror LCD device, no matter how to increase the included angle between the transmittance axes of the polarization conversion layer and the polarizer, only the first transmittance (T %) is decreased, but the first reflectance (R %) cannot be improved.

The mirror display device of Comparative embodiment 1 has the disadvantage of unable to give consideration to both the first reflectance and the first transmittance; and that of Comparative embodiment 2 has the disadvantage that the first reflectance thereof cannot be improved. Thus, the inventors of the present disclosure provide novel mirror display devices in the following embodiments to solve the disadvantages of Comparative embodiments 1 and 2.

Embodiment 1

Figure 9:
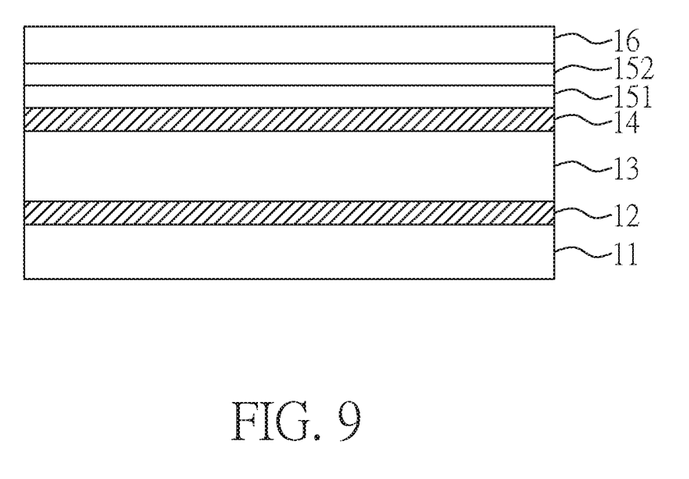
FIG. 9 is a cross-sectional view of a mirror LCD device according to Embodiment 1 of the present disclosure.

As shown in FIG. 9, the structure of the mirror LCD device of the present embodiment is similar to that of Comparative embodiment 2, except that a second polarization conversion layer 152 is further laminated on the first polarization conversion layer 151, so that the first polarization conversion layer 151 is disposed between the first polarizer 14 and the second polarization conversion layer 152. Herein, the first polarization conversion layer 151 and the second polarization conversion layer 152 together form an optical structure. In addition, in the present embodiment, the properties of the first polarization conversion layer 151 and the second polarization conversion layer 152 are similar to the polarization conversion layer described in Comparative embodiment 2, so the descriptions related thereto are not repeated herein.

Figure 10:
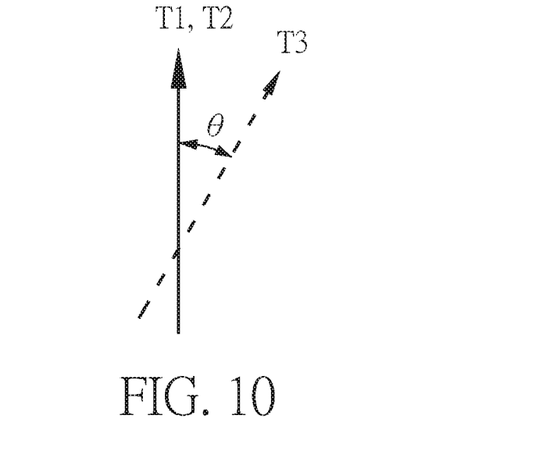
FIG. 10 is a schematic view showing included angles between the first polarizer, the first polarization conversion layer and the second polarization conversion layer in a mirror LCD device according to Embodiment 1 of the present disclosure.

FIG. 10 is a view showing included angles between the first polarizer, the first polarization conversion layer and the second polarization conversion layer in the mirror LCD device of the present embodiment. As shown in FIGS. 9 and 10, in the present embodiment, the first polarizer 14 has a first transmission axis T1, the first polarization conversion layer 151 has a second transmission axis T2, and the second polarization conversion layer 152 has a third transmission axis T3. Herein, an included angle between the first transmission axis T1 and the second transmission axis T2 may be in a range from 0 degree to 5 degree, and for example is 0 degree; and another included angle between the second transmission axis T2 and the third transmission axis T3 is in a range from 5 degree to 90 degree.

Herein, the mirror display device having the structure shown in FIG. 9 is used to detect the first transmittance and the first reflectance of the optical structure when the included angle between the first transmission axis T1 and the second transmission axis T2 is fixed to be 0 degree and the included angle θ between the second transmission axis T2 and the third transmission axis T3 is changed. Herein, the first transmittance is referred to the percentage of the amount of the polarized light passing through the optical structure, wherein the amount of the polarized light obtained from the light emitting from the backlight module 11 and sequentially passing through the second polarizer 12, the display panel 13 and the first polarizer 14 is set to be 100%. The first reflectance is referred to the percentage of the amount of the non-polarized light reflected by the optical structure, wherein the amount of the non-polarized light obtained from the external light irradiating into the display device and passing through the protection substrate 16 is set to be 100%.

Figure 11:
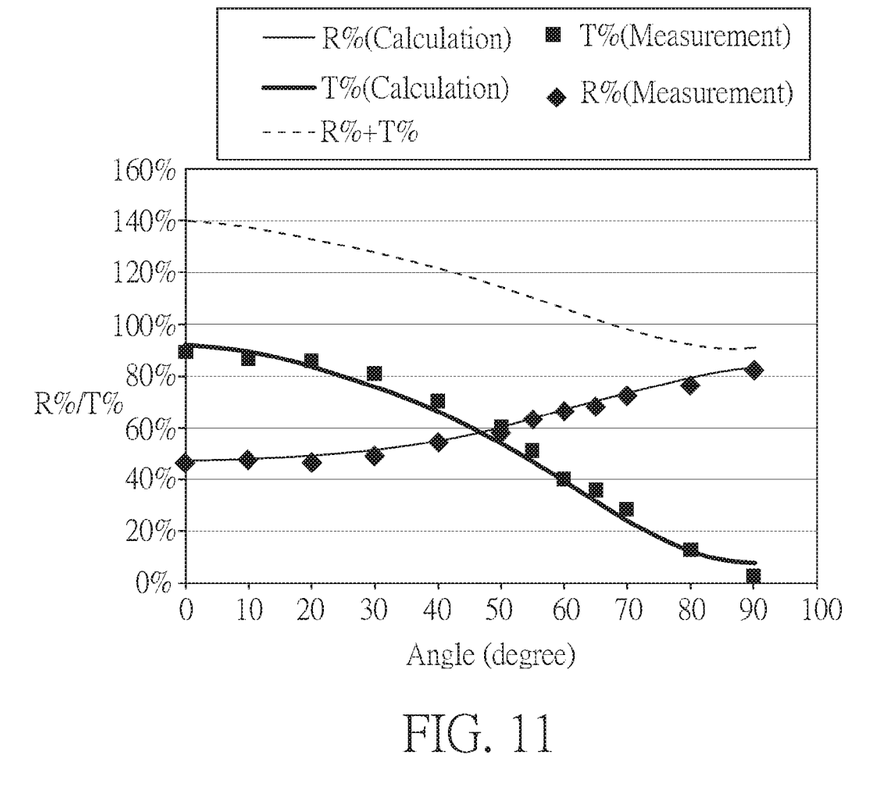
FIG. 11 is a diagram of the first reflectance/the first transmittance vs. the included angles between the transmission axes of the first and second polarization conversion layers in a mirror LCD device according to Embodiment 1 of the present disclosure.

FIG. 11 is a diagram showing the first reflectance/the first transmittance vs. the included angles between the transmission axes of the first and second polarization conversion layers in a mirror LCD device. In FIG. 11, the term "calculation value" is a theoretical value obtained by considering the partial absorption of the first and second polarization conversion layers. According to the results shown in FIG. 11, as the included angle θ between the second transmission axis T2 and the third transmission axis T3 increased, the first transmittance (T %) of the optical structure is decreased and the first reflectance (R %) is increased. In order to obtain both the ideal first transmittance and the ideal first reflectance, the included angle between the second transmission axis T2 and the third transmission axis T3 can be in a range from 25 degree to 70 degree. If the polarization conversion layers has decreased absorption rates, the included angle between the second transmission axis T2 and the third transmission axis T3 can be in a range from 10 degree to 80 degree. When the included angle θ between the second transmission axis T2 and the third transmission axis T3 is in the aforesaid range, not only the purpose that the sum of the first reflectance (R %) and the first transmittance (T %) is greater than 100% and less than 150% (100%<R %+T %<150%) can be achieved, but also good first transmittance and good first reflectance of the optical structure can be maintained. Hence, through controlling the included angle θ between the second transmission axis T2 and the third transmission axis T3, the first transmittance and the first reflectance of the optical structure can be adjusted. Therefore, the first transmittance (T %) can be less than 94%, for example, 30%<T %<94%, and 30%<T %<80%; and the first reflectance (R %) can be greater than 50%, for example 50%<R %<90%, and 50%<R %<75%.

Figure 12:
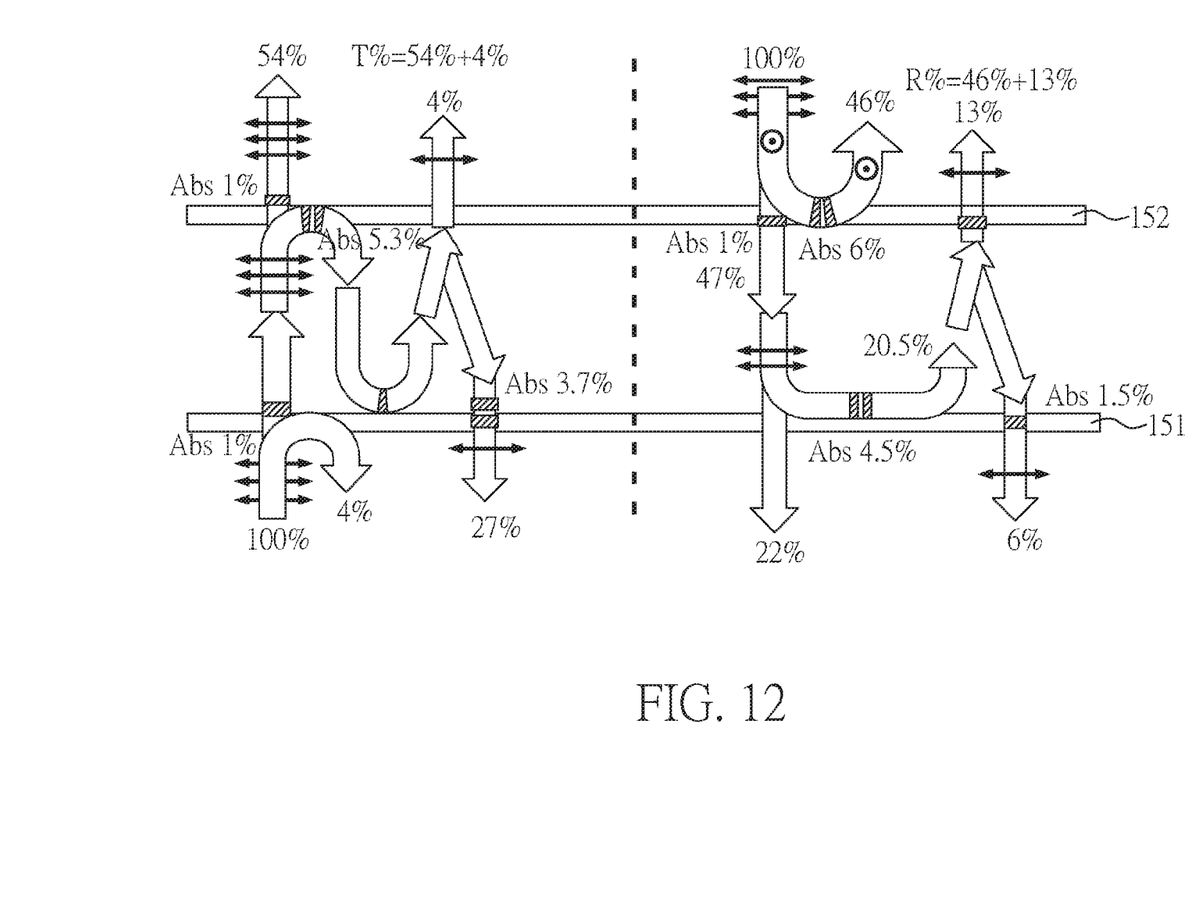
FIG. 12 is a schematic view showing a transmission state and a reflective state of an optical structure in a mirror LCD device according to Embodiment 1 of the present disclosure.

Herein, the reason why the mirror display device of the present embodiment can have improved first transmittance and first reflectance is explained by using the case that the included angle θ between the second transmission axis T2 and the third transmission axis T3 is 50 degree. FIG. 12 is a schematic view showing a transmission state and a reflective state of an optical structure, wherein the left side from the dot line shows the transmission state, and the right side shows the reflective state. As shown in FIGS. 9 and 12, when the amount of the polarized light obtained from the light emitting from the backlight module 11 and sequentially passing through the second polarizer 12, the display panel 13 and the first polarizer 14 is set to be 100%, about 1% amount of the polarized light is absorbed by the first polarization conversion layer 151, about 95% amount can pass through the first polarization conversion layer 151, and about 4% amount is reflected by the first polarization conversion layer 151. When the 95% amount of the polarized light passing through the first polarization conversion layer 151 irradiates into the second polarization conversion layer 152, since the included angle θ between the second transmission axis T2 of the first polarization conversion layer 151 and the third transmission axis T3 of the second polarization conversion layer 152 is 50 degree, only a part of the light (54%) may pass through the second polarization conversion layer 152, another part of the light (40%) may be reflected by the second polarization conversion layer 152, and a small part of the light (1%) may be absorbed by the second polarization conversion layer 152. The 40% amount of the light reflected by the second polarization conversion layer 152 may be reflected by the first polarization conversion layer 151 again and passes through the polarization conversion layer 152 (4%), or may be further reflected by the second polarization conversion layer 152 and passes through the first polarization conversion layer 151 (27%). In addition, small part of the light (5.3%+3.7%) may also be absorbed by the polarization conversion layers due to the repeated reflection. After repeated reflection, the first transmittance of the optical structure of the present embodiment can be up to 58%.

For the reflective state, the non-polarized light obtained from the external light irradiating into the display device and passing through the protection substrate 16 is set to be 100%, about 46% amount is reflected by the second polarization conversion layer 152, 47% amount passes through the second polarization conversion layer 152, and a part of the non-polarized light (1%+6%) is absorbed by the second polarization conversion layer 152. Since the second polarization conversion layer 152 is obtained by laminating films of different refractive indexes along the long axis and short axis, the absorption effect thereof in two polarized directions are not identical. The absorption effect is more obvious during reflection and about 6% amount of the irradiating light may be absorbed by the second polarization conversion layer 152, and 1% amount of the irradiating light may be absorbed during the transmission. 47% amount of the light passing through the second polarization conversion layer 152 has polarization direction due to the polarization selectivity thereof. When the light after passing through the second polarization conversion layer 152 irradiates into the first polarization conversion layer 151, since the included angle between the transmission axes of the first polarization conversion layer 151 and the second polarization conversion layer 152 is 50 degree, similarly, only a part of the light (22%) may pass through the first polarization conversion layer 151, another part of the light (20.5%) may be reflected by the first polarization conversion layer 151, and a small amount of the light (4.5%) may be absorbed by the first polarization conversion layer 151. 20.5% amount of the light reflected by the first polarization conversion layer 151 may pass through the second polarization conversion layer 152 (13%) again, or further be reflected by the second polarization conversion layer 152 and pass through the first polarization conversion layer 151 (6%); and a small amount of the light (1.5%) is further absorbed by the first polarization conversion layer 151. After repeated reflection, the first reflectance of the optical structure of the present embodiment can be up to 59%.

In the present embodiment, as shown in FIG. 11, by controlling the included angle between the transmission axes of the first and second polarization conversion layers, the first reflectance and the first transmittance of the mirror display device can be adjusted. Hence, the disadvantage that the first reflectance of the mirror display device of Comparative embodiment 2 cannot be adjusted can be solved; therefore, the more consumers' requirements can be satisfied. Meanwhile, comparing to the mirror display device using single polarization conversion layer in Comparative embodiment 2, the first reflectance of the mirror display device of the present embodiment equipped with two polarization conversion layers can be over 50%, which is significantly larger than the first reflectance of the mirror display device of Comparative embodiment 2.

Embodiments 2 and 3

Figure 13:
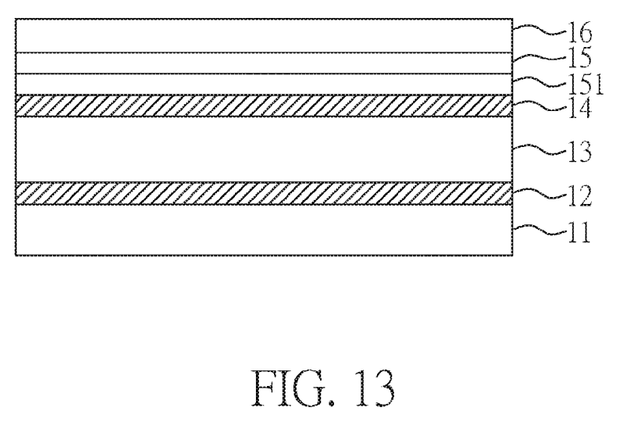
FIG. 13 is a cross-sectional view of a mirror LCD device according to Embodiments 2 and 3 of the present disclosure.

As shown in FIG. 13, the structure of the mirror LCD device of the present embodiment is similar to that of Comparative embodiment 2, except that reflection layer 15 is further laminated on the first polarization conversion layer 151, so that the first polarization conversion layer 151 is disposed between the first polarizer 14 and the reflection layer 15. Herein, the first polarization conversion layer 151 and the reflection layer 15 together form an optical structure. In addition, in the present embodiment, the property of the first polarization conversion layer 151 is similar to that used in Comparative embodiment 2, and the property of the reflection layer 15 is similar to that used in Comparative embodiment 1. The reflection layers 15 used in Embodiments 2 and 3 are respectively the reflection layers with 40% and 60% reflectance illustrated in Comparative embodiment 1; so the descriptions thereof are not repeated herein.

During the preparation of the reflection layer 15, due to the arrangement of the molecules and stretching rate of the reflection layer 15, the obtained reflection layer 15 may has polarization selectivity greater than 0% and less than 10%. Hence, in the present embodiment, the first polarizer 14 has a first transmission axis, the first polarization conversion layer 151 has a second transmission axis, and the reflection layer 15 has a fourth transmission axis. Herein, an included angle between the first transmission axis and the second transmission axis may be in a range from 0 degree to 5 degree, and for example is 0 degree. In addition, an included angle between the transmission axes of the reflection layer 15 and the first polarization conversion layer 151 is not particularly limited. However, in order to improve the first transmittance of the optical structure, the second transmission axis and the fourth transmission axis can be in a range from 0 degree to 5 degree, and for example is 0 degree.

However, in other embodiments of the present disclosure, the reflection layer 15 may not have the transmission axis.

Figure 14:
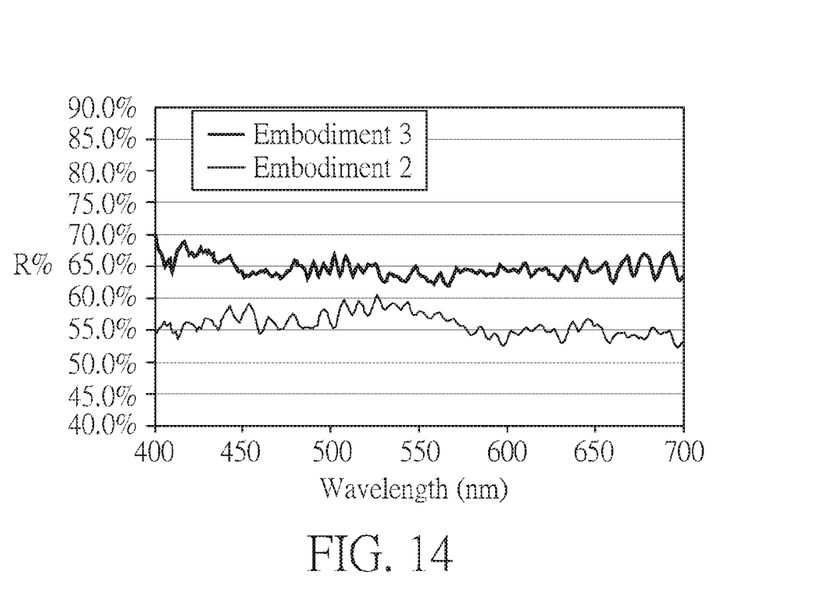
FIG. 14 is a diagram showing detection results of the first reflectance of optical structures in mirror LCD devices according to Embodiments 2 and 3 of the present disclosure.

Herein, the mirror display device having the structure shown in FIG. 13 is used to detect the first reflectance of the optical structure under full wavelength, wherein the included angles between the first and second transmission axes and between the second and fourth transmission axes are 0 degree. When the non-polarized light obtained from the external light irradiating into the display device and passing through the protection substrate 16 is set to be 100%, the measured first reflectance (R %) of the mirror display device is shown in FIG. 14.

Figure 15:
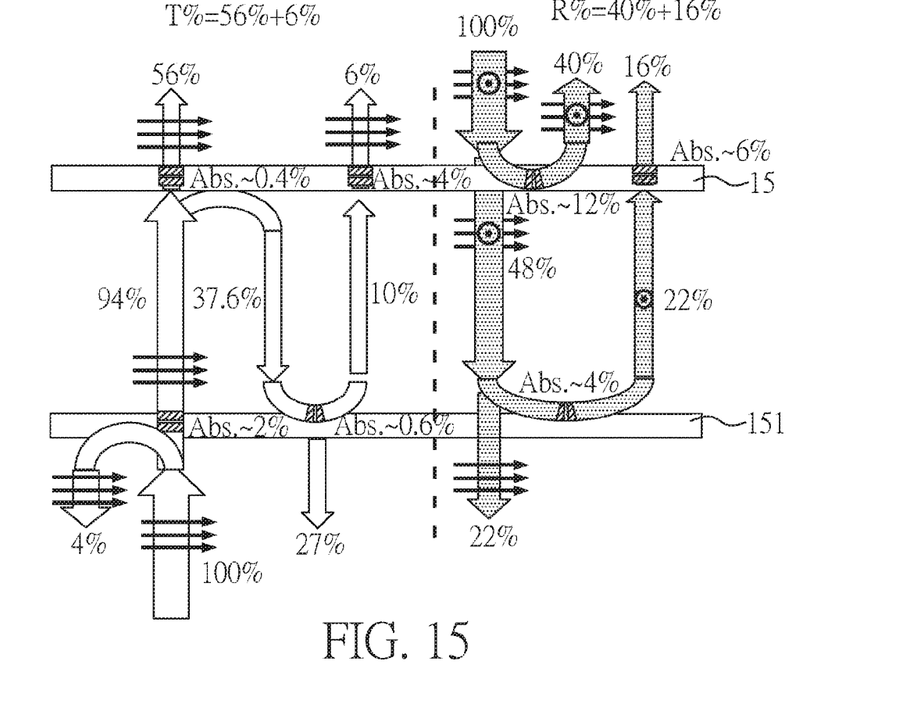
FIG. 15 is a schematic view showing a transmission state and a reflective state of an optical structure in a mirror LCD device according to Embodiment 2 of the present disclosure.

Herein, the reason why the mirror display device of the present embodiment can have improved first transmittance and first reflectance is explained by using the case that both the included angles between the first and second transmission axes and between the second and fourth transmission axes are 0 degree and the reflection layer 15 is a reflection layer having a first reflectance of 40%. FIG. 15 is a schematic view showing a transmission state and a reflective state of an optical structure in the mirror LCD of the present embodiment, wherein the left side from the dot line shows the transmission state, and the right side shows the reflective state. For the transmission state, when the polarized light obtained from the light emitting from the backlight module 11 and sequentially passing through the second polarizer 12, the display panel 13 and the first polarizer 14 is set to be 100%, about 2% amount of the polarized light is absorbed by the first polarization conversion layer 151, about 94% amount can pass through the first polarization conversion layer 151, and about 4% amount is reflected by the first polarization conversion layer 151. 94% amount of the light passing through the first polarization conversion layer 151 then irradiates into the reflection layer 15, only a part of the light (56%) can pass through the reflection layer 15, another part of the light (37.6%) is reflected by the reflection layer 15, and a small part of the light (0.4%) is absorbed. 37.6% amount of the light reflected by the reflection layer 15 may further be reflected by the first polarization conversion layer 151 and pass through the reflection layer 15 (6%). After repeated reflections, the first transmission of the optical structure of the present embodiment can be up to 62%.

As for the reflective state, the external light irradiating into the display device and passing through the protection substrate 16 is set to be 100%, about 40% amount is reflected by the reflection layer 15, about 48% amount passes through the reflection layer 15, and a part of the light (12%) is absorbed by the reflection layer 15. The reflection layer 15 only has a little polarization selectivity, so 48% amount of the light passing through the reflection layer 15 is mostly still the non-polarized light. Because of the polarization selectivity of the first polarization conversion layer 151, when the non-polarized light irradiates into the first polarization conversion layer 151, only the light (22%) with the polarization direction identical to the transmission axis of the first polarization conversion layer 151 can pass therethrough, the light (22%) with the polarization direction different to the transmission axis thereof is reflected by the same, and small amount of the light (4%) is absorbed. The light reflected by the first polarization conversion layer 151 (22%) can further pass through the reflection layer 15 (16%), and small amount of the light (6%) is further absorbed. After repeated reflections, the first reflectance of the optical structure of the present embodiment can be up to 56%.

Hence, in the present embodiment, as shown in FIG. 11, the disposition of the polarization conversion layer and the reflection layer in the mirror display device can adjust the first reflectance and the first transmittance of the optical structure therein, and further improve the problem that the both the first reflectance and the first transmittance cannot be simultaneously adjusted. Meanwhile, the first reflectance of the mirror display device with two polarization conversion layer shown in the present embodiment is over 50%, which is significantly larger than the first reflectance of the mirror display device with only one polarization conversion layer shown in Comparative embodiment 2.

Embodiment 4

Figure 16:
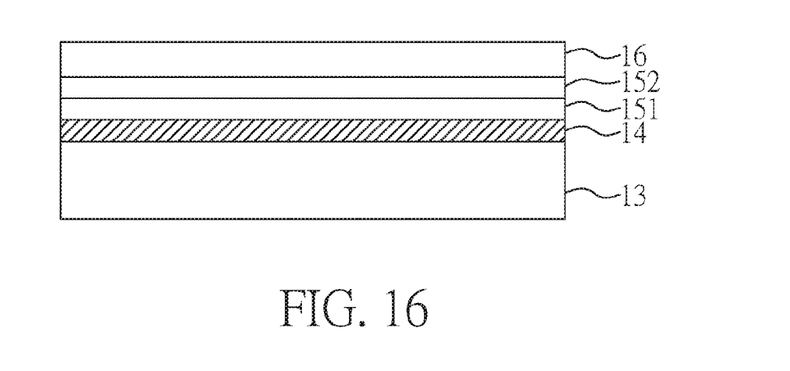
FIG. 16 is a cross-sectional view of a mirror LCD device according to Embodiment 4 of the present disclosure.

The structure of the mirror display device of the present embodiment is similar to that of Embodiment 1, except that the display panel 13 used in the present embodiment is an OLED display panel, as shown in FIG. 16. Hence, the backlight module and the second polarizer used in the display device of Embodiment 1 are no longer equipped in the mirror display device of the present embodiment.

Figure 17:
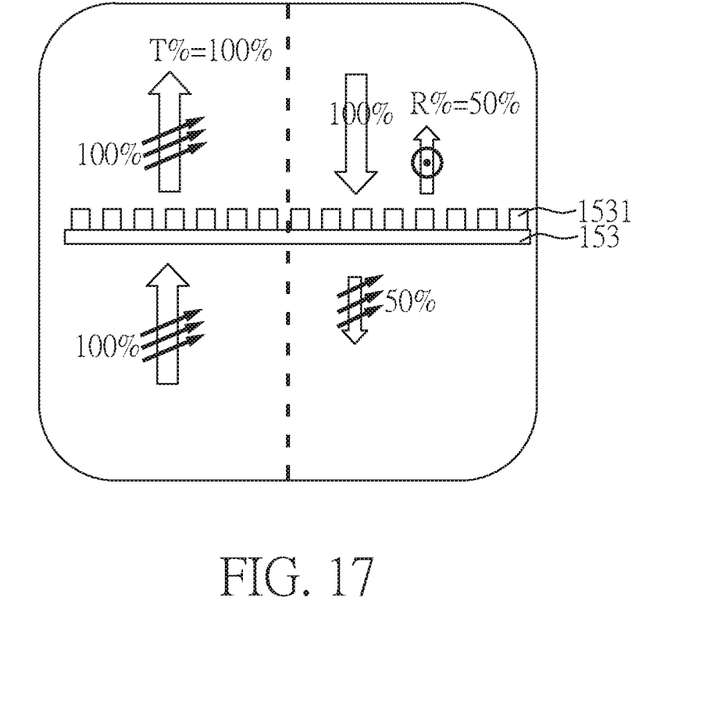
FIG. 17 is a schematic view showing a transmission state and a reflective state of another polarization conversion layer of the present disclosure.

In the aforementioned embodiments of the present disclosure, at least one of the first and second polarization conversion layers can be replaced by polarization conversion layer having the structure shown in FIG. 17, which is a multi-layered film 153 with metal grids 1531 disposed thereon. In FIG. 17, the left side from the dot line shows the transmission state, and the right side shows the reflective state. The first reflectance of the polarization conversion layer structure shown in FIG. 17 is about 50%, and the first transmittance thereof is about 100%; and the first reflectance and transmittance thereof are similar to those of the polarization conversion layer shown in FIG. 5. However, in other embodiments of the present disclosure, in the transmission state, the light may be reflected by the metal grids 1531, and thus the first transmittance thereof may be reduced to about 80%.

In addition, in the aforementioned embodiments of the present disclosure, the first polarization conversion layer and the second polarization conversion layer or the reflection layer in the optical structure are formed by laminating two independent films. However, in other embodiments of the present disclosure, the first polarization conversion layer and the second polarization conversion layer or the reflection layer can be integrated into one film to form the optical structure illustrated in the present disclosure.

Additionally, the mirror display devices provided by the aforementioned embodiments can also be co-used with a touch panel, to form a touch display device.

Furthermore, the mirror display devices and the touch display device provided by the aforementioned embodiments can be applied to any electronic device for displaying and reflecting images, for example, televisions and mirrors.

Although the present disclosure has been explained in relation to its preferred embodiment, it is to be understood that many other possible modifications and variations can be made without departing from the spirit and scope of the disclosure as hereinafter claimed.

What is claimed is:

1. A mirror display device, comprising:
   a display panel;
   a first polarizer disposed on the display panel; and
   an optical structure disposed on the first polarizer and comprising:
      a first polarization conversion layer; and
      a second polarization conversion layer, wherein the first polarization conversion layer is disposed between the first polarizer and the second polarization conversion layer, wherein the first polarization conversion layer has a first transmission axis, and the second polarization conversion layer has a second transmission axis;

wherein the included angle between the first transmission axis and the second transmission axis is in a range from 5 degree to 90 degree;

wherein a sum of a first reflectance and a first transmittance of the optical structure is greater than 100% and less than 150%, in which the first reflectance is referred to a percentage of an amount of external light irradiating into the mirror display device and reflected by the optical structure, and the first transmittance is referred to a percentage of an amount of light passing through the first polarizer and then irradiating into and passing through the optical structure.

2. The mirror display device of claim 1, wherein the first transmittance (T %) is 30%<T %<94%.

3. The mirror display device of claim 1, wherein the first reflectance (R %) is 50%<R %<90%.

4. The mirror display device of claim 1, wherein the first polarizer has a third transmission axis, and the included angle between the first transmission axis and the third transmission axis is in a range from 0 degree to 5 degree.

5. The mirror display device of claim 1, wherein the included angle between the first transmission axis and the second transmission axis is in a range from 10 degree to 80 degree.

6. The mirror display device of claim 5, wherein the included angle between the first transmission axis and the second transmission axis is in a range from 25 degree to 75 degree.

7. A mirror display device, comprising:
a display panel;
a first polarizer disposed on the display panel; and
an optical structure disposed on the first polarizer and comprising:
a first polarization conversion layer; and
a reflection layer, wherein the first polarization conversion layer is disposed between the first polarizer and the reflection layer, wherein a sum of a first reflectance and a first transmittance of the optical structure is greater than 100% and less than 150%, in which the first reflectance is referred to a percentage of an amount of external light irradiating into the mirror display device and reflected by the optical structure, and the first transmittance is referred to a percentage of an amount of light passing through the first polarizer and then irradiating into and passing through the optical structure;

wherein the reflection layer has polarization selectivity greater than 0% and less than 10%.

8. The mirror display device of claim 7, wherein the optical structure further comprises the first polarization conversion layer and the reflection layer, the first polarization conversion layer has a first transmission axis, the first polarizer has a third transmission axis, and the reflection layer has a fourth transmission axis; wherein an included angle between the first transmission axis and the third transmission axis is in a range from 0 degree to 5 degree, and another included angle between the first transmission axis and the fourth transmission axis is in a range from 0 degree to 5 degree.

9. The mirror display device of claim 7, wherein the reflection layer has a first reflectance ranging from 40% to 75%.

* * * * *